(12) United States Patent
Nakagomi (10) Patent No.: US 8,345,986 B2
(45) Date of Patent: Jan. 1, 2013

(54) IMAGE PROCESSING APPARATUS, IMAGE PROCESSING METHOD AND COMPUTER READABLE-MEDIUM

(75) Inventor: Kouichi Nakagomi, Tokorozawa (JP)

(73) Assignee: Casio Computer Co., Ltd., Tokyo (JP)

( * ) Notice: Subject to any disclaimer, the term of this patent is extended or adjusted under 35 U.S.C. 154(b) by 237 days.

(21) Appl. No.: 12/874,705

(22) Filed: Sep. 2, 2010

(65) Prior Publication Data

US 2011/0058747 A1   Mar. 10, 2011

(30) Foreign Application Priority Data

Sep. 4, 2009   (JP) ............................... P2009-204213

(51) Int. Cl.
*G06K 9/46* (2006.01)
*G06K 9/66* (2006.01)

(52) U.S. Cl. ......... 382/195; 345/426; 382/103; 382/274

(58) Field of Classification Search .................. 345/426; 382/103, 195, 224, 274
See application file for complete search history.

(56) References Cited

U.S. PATENT DOCUMENTS

| 7,539,572 | B2 | 5/2009 | Kamikawa et al. | |
| 7,796,833 | B2 * | 9/2010 | Polonskiy et al. | 382/274 |
| 8,098,886 | B2 * | 1/2012 | Koch et al. | 382/103 |
| 2004/0155879 | A1 * | 8/2004 | Mittring | 345/426 |
| 2008/0049145 | A1 | 2/2008 | Yokoyama et al. | |
| 2009/0080791 | A1 | 3/2009 | Chen et al. | |
| 2009/0112287 | A1 * | 4/2009 | Greenberg et al. | 607/54 |
| 2010/0098342 | A1 * | 4/2010 | Davis et al. | 382/220 |
| 2011/0058747 | A1 * | 3/2011 | Nakagomi | 382/195 |

FOREIGN PATENT DOCUMENTS

| CN | 1412525 A | 2/2003 |
| CN | 101394485 A | 3/2009 |
| JP | 2008-053775 A | 3/2008 |

OTHER PUBLICATIONS

L. Itti et al; Short Papers; A Model of Saliency-Based Visual Attention for Rapid Scene Analysis; IEEE Transactions on Pattern Analysis and Machine Intelligence; vol. 20, No. 11, Nov. 1998.
Japanese Office Action dated Jun. 28, 2011 and English translation thereof in counterpart Japanese Application No. 2009-204213.
Chinese Office Action dated Jun. 4, 2012 and English translation thereof in counterpart Chinese Application No. 201010540236.6.

* cited by examiner

Primary Examiner — Gregory M Desire
(74) Attorney, Agent, or Firm — Holtz, Holtz, Goodman & Chick, PC (57) ABSTRACT

There is provided an image processing apparatus. The image processing apparatus includes: an obtaining unit configured to obtain an image; a generating unit configured to generate a plurality of feature maps for a plurality of features of the image, wherein each of the feature maps corresponds to one of the features of the image; an imaging situation determining unit configured to determine an imaging situation of the image; a weighting unit configured to weight the feature maps in accordance with the imaging situation; and a detector configured to detect a region of interest from the image based on feature distributions of the weighted feature maps.

5 Claims, 9 Drawing Sheets

| IMAGING MODE INFORMATION | WEIGHTING FACTOR | | |
|---|---|---|---|
| | w1 | w2 | w3 |
| PORTRAIT | 0.24 | 0.35 | 0.41 |
| SCENERY | 0.36 | 0.25 | 0.39 |
| SCENERY AND PORTRAIT | 0.12 | 0.33 | 0.55 |
| CHILD | 0.24 | 0.32 | 0.44 |
| SPORT | 0.15 | 0.56 | 0.29 |
| CANDLELIGHT | 0.36 | 0 | 0.64 |
| PARTY | 0.24 | 0.35 | 0.41 |
| PET | 0.64 | 0.32 | 0.04 |

|   | IMAGE SET |
|---|---|
| 1 | PORTRAIT |
| 2 | SCENERY |
| 3 | SCENERY AND PORTRAIT |
| 4 | CHILD |
| 5 | SPORT |
| 6 | CANDLELIGHT |
| 7 | PARTY |
| 8 | PET |

| k | w1 | w2 | w3 |
|---|----|----|----|
| 1 | 0.1 | 0.1 | 0.8 |
| 2 | 0.2 | 0.1 | 0.7 |
| 3 | 0.3 | 0.1 | 0.6 |
| 4 | 0.4 | 0.1 | 0.5 |
| 5 | 0.5 | 0.1 | 0.4 |
| ⋮ | ⋮ | ⋮ | ⋮ |

Tjk (x,y)

IMAGE PROCESSING APPARATUS, IMAGE PROCESSING METHOD AND COMPUTER READABLE-MEDIUM

CROSS-REFERENCE TO RELATED APPLICATION

This application claims priority from Japanese Patent Application No. 2009-204213, filed on Sep. 4, 2009, the entire contents of which are hereby incorporated by reference.

BACKGROUND

1. Technical Field

The present invention relates to an image processing apparatus, an image processing method, and a computer readable-medium.

2. Related Art

In the field of image processing, a technology has been known which detects a region of interest (ROI) from an image to be processed, by generating a plurality of feature maps representing physical features obtained from the image and integrating them.

As a more concrete method, for example, according to Treisman's feature integration theory, a saliency map obtained by integrating a plurality of feature maps is obtained as a region of interest of an image. According to the theory of Itti, Koch et al., feature maps are normalized by the square error from the average value of each, and all the feature maps are integrated by the linear combination method. Then, the integrated feature map is recursively filtered by a difference-of-Gaussian filter, and a local peak of the finally obtained filtering result is obtained as a region of interest (see e.g., Non-patent Reference 1).

For the plurality of feature maps used by the above-mentioned theories, it is considered typical to use the nature of paying attention with higher priority to a visually salient object in the initial stage of the human viewing process such as high lightness, a specific color or high contrast.

[Non-patent Reference 1] Laurent Itti, Christof Koch, and Ernst Niebur, "A Model of Saliency-Based Visual Attention for Rapid Scene Analysis", IEEE TRANSACTIONS ON PATTERN ANALYSIS AND MACHINE INTELLIGENCE, (U.S.A.), IEEE Computer Society, November 1998, Vol. 20, Number 11, pp. 1254-1259

However, in the case of the theory described in Non-patent Reference 1, the weight on the kind of the physical feature is fixed, and when it is applied, for example, to an image having various physical features, it is difficult to appropriately extract a region of interest from the image.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any of the disadvantages described above.

Accordingly, it is an illustrative aspect of the present invention to provide an image processing apparatus, an image processing method and a computer readable-medium, capable of appropriately detecting a region of interest (ROI) in consideration of the imaging situation.

According to one or more illustrative aspects of the present invention, there is provided an image processing apparatus. The image processing apparatus includes: an obtaining unit configured to obtain an image; a generating unit configured to generate a plurality of feature maps for a plurality of features of the image, wherein each of the feature maps corresponds to one of the features of the image; an imaging situation determining unit configured to determine an imaging situation of the image; a weighting unit configured to weight the feature maps in accordance with the imaging situation; and a detector configured to detect a region of interest from the image based on feature distributions of the weighted feature maps.

According to one or more illustrative aspects of the present invention, there is provided an image processing method. The method includes: (a) obtaining an image; (b) generating a plurality of feature maps for a plurality of features of the image, wherein each of the feature maps corresponds to one of the features of the image; (c) determining an imaging situation of the image; (d) weighting the feature maps in accordance with the imaging situation; and (e) detecting a region of interest from the image based on feature distributions of the weighted feature maps.

According to one or more illustrative aspects of the present invention, there is provided a computer-readable medium storing a program for causing the computer to perform operations. The operations includes: (a) obtaining an image; (b) generating a plurality of feature maps for a plurality of features of the image, wherein each of the feature maps corresponds to one of the features of the image; (c) determining an imaging situation of the image; (d) weighting the feature maps in accordance with the imaging situation; and (e) detecting a region of interest from the image based on feature distributions of the weighted feature maps.

DETAILED DESCRIPTION OF EXEMPLARY EMBODIMENTS

Hereinafter, exemplary embodiments of the present invention will be now described with reference to the drawings. It should be noted that the scope of the invention is not limited to the illustrated example.

Figure 1:
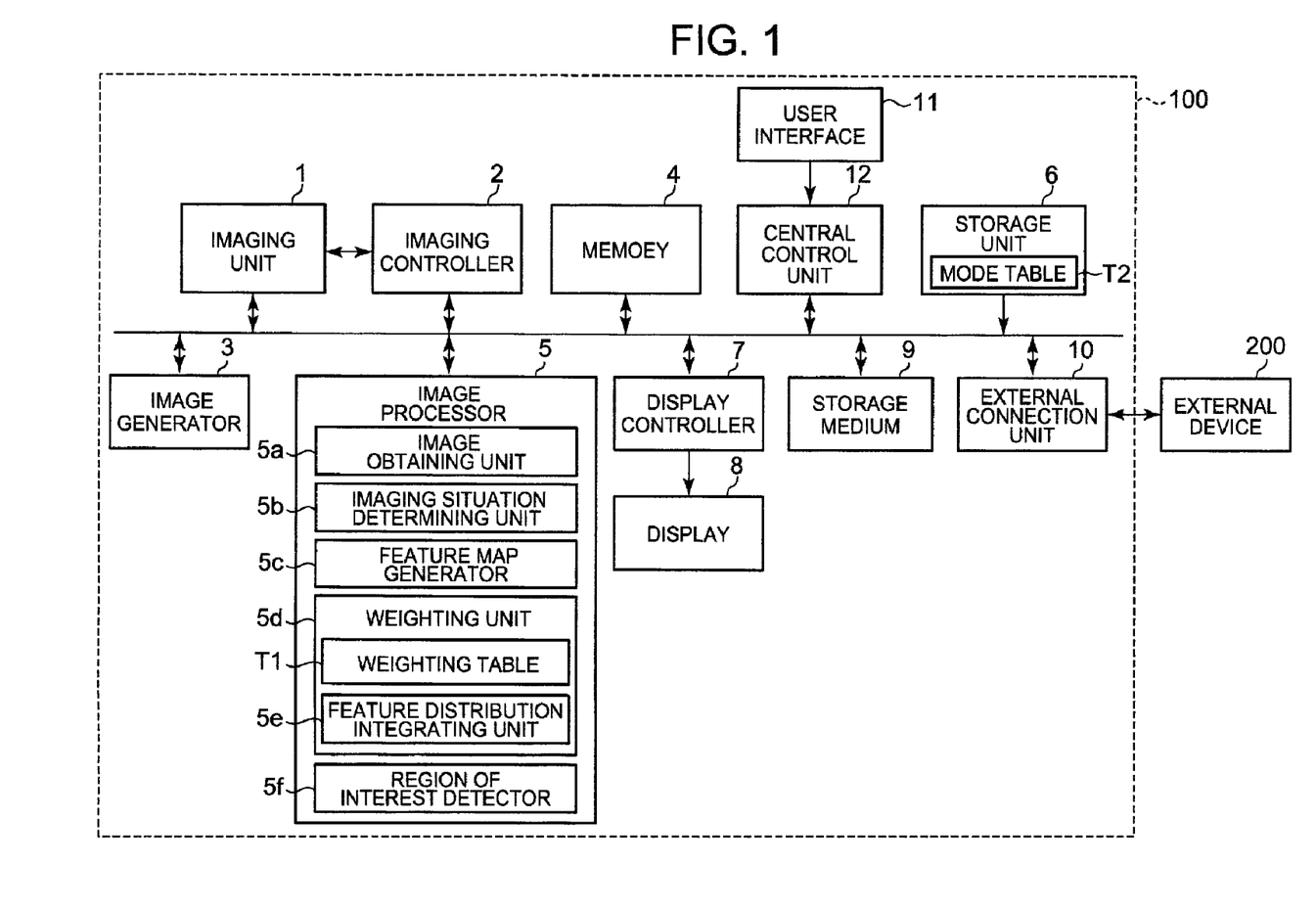
FIG. 1 is a block diagram showing an imaging apparatus according to an embodiment of the present invention.

FIG. 1 is a schematic block diagram showing an imaging apparatus 100 according to an embodiment of the present invention.

In the imaging apparatus 100 of the present embodiment, according to the imaging situation of the image to be processed, the feature map associated with each of a plurality of features of the image to be processed is weighted, and based on the feature distributions of the plurality of weighted feature maps, a region of interest (ROI) is detected from the image.

Specifically, as shown in FIG. 1, the imaging apparatus 100 includes: a imaging unit 1, an imaging controller 2, an image generator 3, a memory 4, an image processor 5, a storage unit 6, a display controller 7, a display 8, a storage medium 9, an external connection unit 10, an user interface 11, and a central control unit 12.

The imaging unit 1 images subject and generates an image frame Specifically, although not shown, the imaging unit 1 includes: a lens unit including a plurality of lenses such as a zoom lens and a focus lens; a diaphragm that adjusts the amount of light passing through the lens unit; and an image sensor such as a CCD (charge coupled device) or a CMOS (complementary metal-oxide semiconductor), and further includes an electronic imaging unit that converts the optical image passing through the lenses of the lens unit, into a two-dimensional image signal.

The imaging controller 2 includes, although not shown, a timing generator and a driver. The imaging controller 2 scans and drives the electronic imaging unit by the timing generator and the driver to cause the electronic imaging unit to convert an optical image into a two-dimensional image signal at predetermined intervals, reads an image frame on a screen-by-screen basis from an imaging region of the electronic imaging unit, and outputs it to the image generator 3.

The imaging controller 2 also performs AE (automatic exposure processing), AF (automatic focusing processing), AWB (automatic white balance) and the like as imaging condition adjustment control.

The image generator 3 performs gain adjustment as appropriate for each of the color components of R, G and B on an analog signal of the image data transferred from the electronic imaging unit, sample-holds the signal by a sample-holding circuit (not shown), converts it into digital data by an A/D converter (not shown), performs color process processing including pixel interpolation and gamma correction by a color process circuit (not shown), and generates digital brightness signal Y and color difference signals Cb and Cr (image data in the YUV color space).

The brightness signal Y and the color difference signals Cb and Cr outputted from the color process circuit are DMA-transferred to the memory 4 used as a buffer memory, through a non-illustrated DMA controller.

The memory 4 is, for example, a DRAM, and temporarily stores data to be processed by the image processor 5, the central control unit 12 and the like.

The image processor 5 includes an image obtaining unit 5a that obtains an input image imaged by the imaging unit 1, as an image to be processed.

Specifically, the image obtaining unit 5a obtains, for example, the YUV data of the input image (see FIG. 4) generated by the image generator 3 when a live view image or a recording image is shot.

Figure 4:
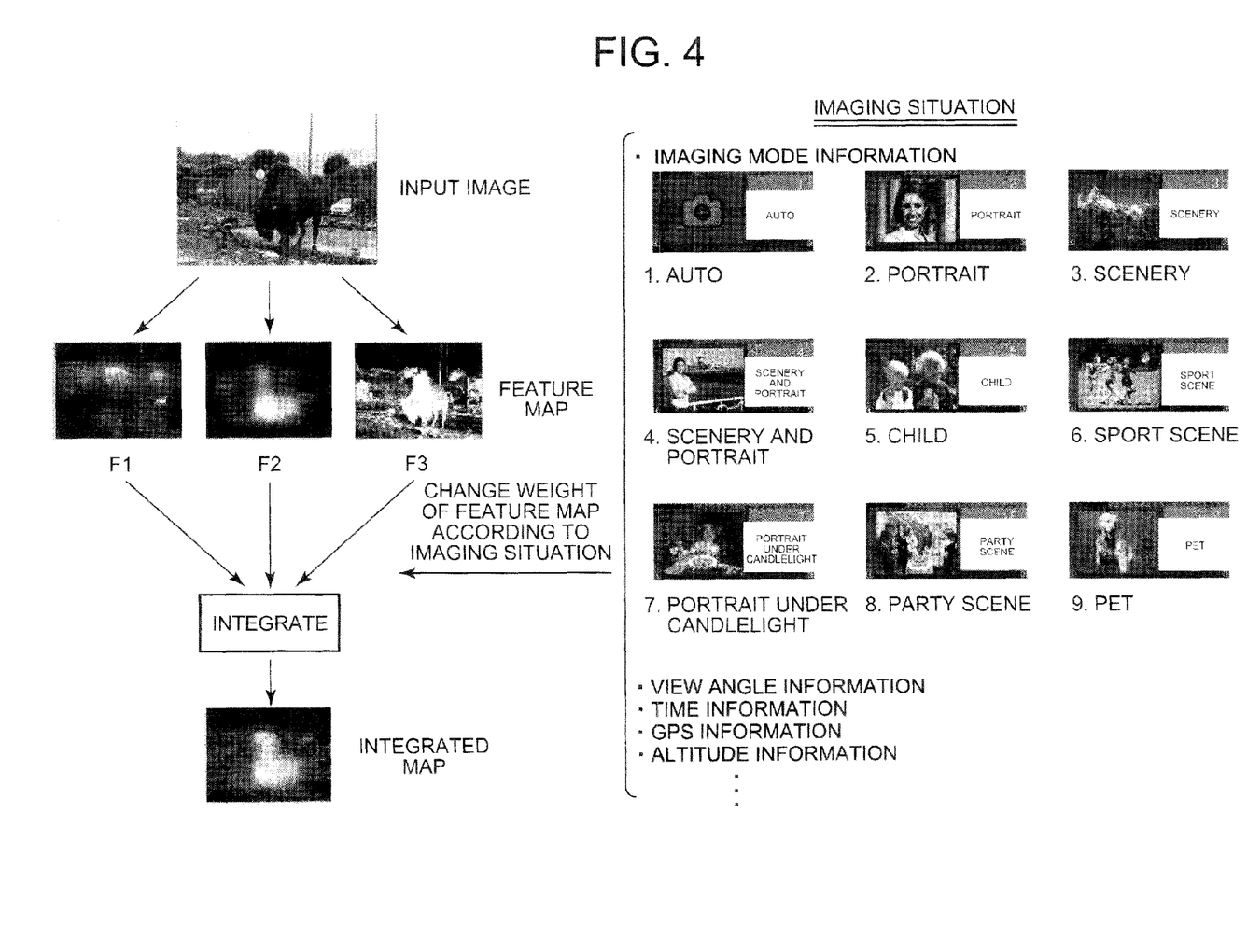
FIG. 4 is a view for explaining the region of interest detecting processing.

The image processor 5 further includes an imaging situation determining unit 5b that determines, when a subject is shot, the imaging situation of the image (see FIG. 4).

Specifically, the imaging situation determining unit 5b determines, based on a selection of an imaging mode (selected scene) according to a user operation of a selection enter button of the user interface 11, the imaging condition by setting the imaging condition corresponding to the imaging mode. More specifically, the imaging situation determining unit 5b determines, as the imaging situation, the imaging condition (imaging mode information) of the subject such as the exposure condition (the shutter speed, the aperture, or the amplification factor, etc.) and the white balance defined by the imaging mode specified by the user from among a plurality of imaging modes such as "1. auto", "2. portrait", "3. scenery", "4. scenery and portrait", "5. child", "6. sport", "7. candlelight", "8. party", and "9. pet".

The imaging situation determining unit 5b also determines, based on the zoom amount (zoom lens position) specified according to a user operation of the user interface 11, view angle information associated with the view angle that is set according to the zoom amount, as the imaging situation of the image.

The imaging situation determining unit 5b also determines, as the imaging situation of the image, time information associated with the time counted by a non-illustrated counting unit.

The imaging situation determining unit 5b also determines, as the imaging situation of the image, GPS (global positioning system) information and altitude information based on the position detected by a non-illustrated position detector.

The imaging mode information, the view angle information, the time information, the GPS information and the altitude information shown as the imaging situation of the image are merely an example, and the present invention is not limited thereto.

The imaging situation determining unit 5b and the user interface 11 constitutes an imaging situation determining unit defined in the claims.

The image processor 5 further includes a feature map generator 5c that generates a plurality of feature maps (see FIG. 4) for each of a plurality of features of the input image obtained by the image obtaining unit 5a.

The feature map generator 5c generates a reduced-size image (for example, an image of VGA size [x×y: 640×480 pixels] reduced at a predetermined ratio both horizontally (x axis) and vertically (y axis) based on the image data (YUV data) obtained by the image obtaining unit 5a, and then, generates a first to third feature maps F1 to F3 using, for example, the contrast, the Bhattacharyya distance of the histogram and the degree of dispersion (degree of gathering) of each color.

Specifically, the feature map generator 5c first generates, based on the image data of the reduced-size image, a plurality of images further reduced at predetermined different ratios both horizontally (x axis) and vertically (y axis). Then, the feature map generator 5c calculates the contrast of each of the generated plurality of reduced-size images, enlarges the contrasts in correspondence with the reduction ratios of the images so that the sizes thereof are the same, and adds them together, thereby generating the first feature map F1.

Moreover, the feature map generator 5c generates a plurality of frames having different sizes and shapes with each pixel as the center based on the image data of the reduced-size image. Then, the feature map generator 5c calculates the Bhattacharyya distance of the histogram as the index of the similarity between image areas in the frames, and then, distinguishably paints each pixel based on the Bhattacharyya distance, thereby generating the second feature map F2. In the second feature map F2 shown in FIG. 4, the larger the Bhattacharyya distance of the histogram is, the whiter pixels are. Here, the Bhattacharyya distance is a measure of distance where the geometric mean of two probability density distributions is integrated in all the areas, the self-information amount thereof is obtained after the dimension is returned to the probability and the self-information amount is interpreted as a distance.

Moreover, the feature map generator 5c converts the image data in the YUV color space of the reduced-size image into image data in the HSV color space according to a predetermined conversion formula, and then, expresses it as a mixture Gaussian distribution by using an EM algorithm. Then, the feature map generator 5c calculates a dispersion value for a plurality of groups (color clusters) grouped according to a predetermined criterion, and then, distinguishably paints each pixel based on the distribution value, thereby generating the third feature map F3. In the third feature map F3 shown in FIG. 4, the lower the dispersion value is (the more the color gathers), the whiter pixels are.

While the first to third feature maps F1 to F3 are shown as feature maps, these are merely an example, and the present invention is not limited thereto. Any feature maps may be generated as long as they are associated with various features of the input image. The number (kind) of feature maps is not limited to three. It is necessary only that it is more than one.

The image processor 5 further includes a weighting unit 5d that weights the plurality of feature maps generated by the feature map generator 5c.

That is, the weighting unit 5d stores, as weighting factor storage unit, a weighting table T1 in which weighting factors w1 to w3 of the first to third feature maps F1 to F3 are associated with imaging conditions.

Figure 2:
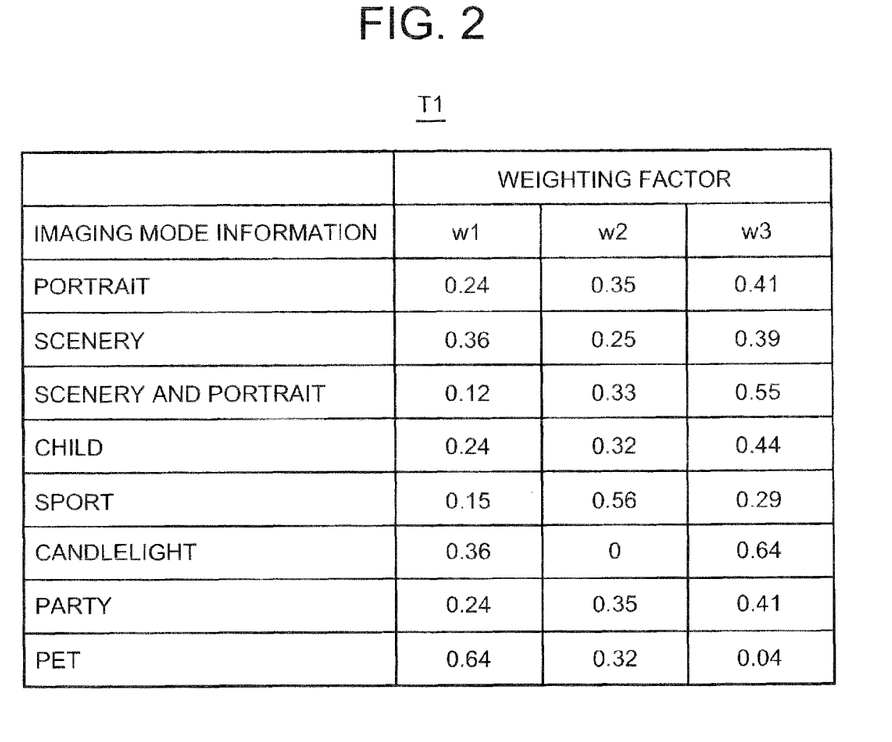
FIG. 2 is a view showing an example of a weighting table stored in the imaging apparatus of FIG. 1.

In the weighting table T1, as shown in FIG. 2, the weighting factors w1 to w3 of the first to third feature maps F1 to F3 are stored in a state of being associated with each of a plurality of imaging modes "portrait", "scenery", "scenery and portrait", "child", "sport", "candlelight", "party" and "pet" defining the imaging condition of the subject.

The weighting table T1 is created by a weighting table creating processing (described later) by an external device 200 (described later) connected to the imaging apparatus 100 through the external connection unit 10, and then, is transmitted to the imaging apparatus 100 to be stored in the weighting unit 5d.

The weighting unit 5d weights the first and third feature maps F1 to F3 according to the imaging condition of the subject associated with the imaging mode specified from among the plurality of imaging modes based on a user operation of the user interface 11. Specifically, the weighting unit 5d includes a feature distribution integrating unit 5e that integrates the feature distributions of the first to third feature maps F1 to F3 weighted according to the weighting factors w1 to w3.

That is, when one of the imaging modes is specified based on a user operation of the user interface 11, the weighting unit 5d determines the weighting factors w1 to w3 of the first to third feature maps F1 to F3 corresponding to the imaging mode in the weighting table T1, and then, reads predetermined weighting factors (for example, the weighting factor w1, etc.) to obtain them. Then, the feature distribution integrating unit 5e weights the first to third feature maps F1 to F3 according to the obtained weighting factors w1 to w3, and generates an integrated map T(x,y). Specifically, the feature distribution integrating unit 5e generates the integrated map T(x,y) by multiplying the feature distributions of the first to third feature maps F1 to F3 and the corresponding weighting factors w1 to w3 together and integrating them according to the following expression (1)

$$T(X, Y) = \sum_{i=0}^{I} wi \cdot Fi(x, y) \quad (1)$$

Here, "i" is the index for specifying the first to third feature maps F1 to F3 and the weighting factors w1 to w3. The integrated map T(x,y) is expressed by values "0" to "1", and a region more likely to be a main subject takes a value closer to "1". In FIG. 4, the closer to "1" the value of a region is, the whiter the region is.

The feature distribution integrating unit 5e constitutes an integrating unit defined in the claims.

While the imaging mode information that defines the imaging condition of the subject is shown as an example of the imaging situation, the present invention is not limited thereto. When an imaging situation such as the view angle information, the time information, the GPS information or the altitude information is determined by the imaging situation determining unit 5b in subject imaging, the weighting unit 5d may weight the first to third feature maps F1 to F3 according to the imaging situation.

Moreover, while a table in which the imaging mode information and the weighting factors w1 to w3 of the first to third feature maps F1 to F3 are associated with each other is shown as an example of the weighting table T1, this is merely an example, and the present invention is not limited thereto. The weighting table T1 may be a table in which a different imaging situation such as the view an information, the time information, the GPS information or the altitude information and the weighting factors w1 to w3 of the first to third feature maps F1 to F3 are stored in a state of being associated with each other.

Figure 3:
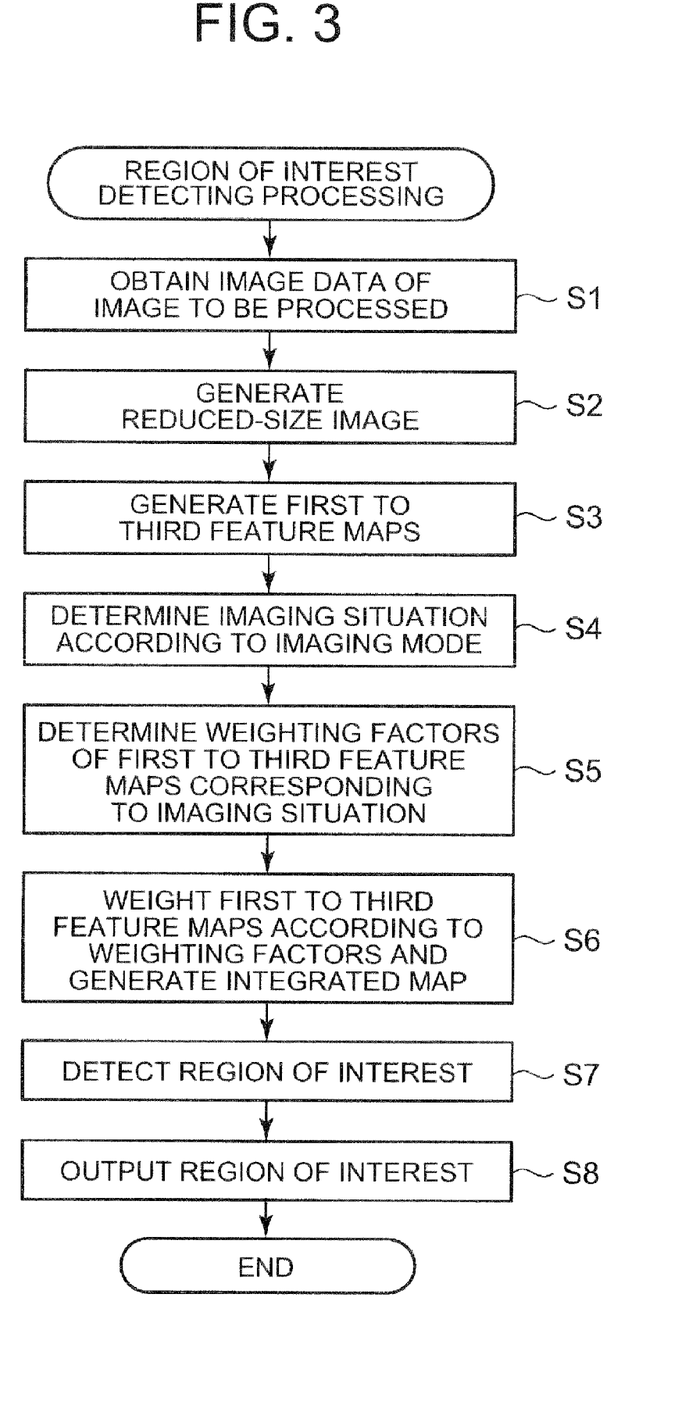
FIG. 3 is a flowchart showing an example of an operation associated with the region of interest detection processing by the imaging apparatus of FIG. 1.

Further, the numerical values of the weighting factors w1 to w3 of the weighting table T1 shown in FIG. 3 are merely an example, and the present invention is not limited thereto. These values may be arbitrarily changed as appropriate according to the detection accuracy of the region of interest.

The weighting unit 5d constitutes a weighting unit defined in the claims.

The image processor 5 further includes a region of interest (ROI) detector 5f that detects a region of interest (ROI) from the input image based on the feature distribution of the integrated map generated by the feature distribution integrating unit 5e.

The region of interest detector 5f detects a region having a predetermined threshold value or more as a region of interest (ROI) based on the integrated map T(x,y). Specifically, the region of interest detector 5f enlarges the integrated map T(x,y) both horizontally (x axis) and vertically (y axis) at a ratio corresponding to the reduction ratio so that it corresponds to the original size of the input image obtained by the image obtaining unit 5a. Thereafter, the region of interest detector 5f applies the feature distribution of the enlarged integrated map T(x,y) to the input image, and detects a region having the predetermined threshold value or more as a region of interest.

The region of interest detector 5f constitutes a detector defined in the claims.

The storage unit 6 is, for example, a nonvolatile memory (flash memory), and stores various programs and data (not shown) necessary for the operation of the central control unit 12.

The storage unit 6 also stores a mode table T2 associated with the setting of a plurality of imaging modes of the subject.

The mode table T2 stores a plurality of imaging modes for each of which the imaging condition of the subject such as the exposure condition (the shutter speed, the aperture or the amplification factor, etc.) or the white balance is defined.

Examples of the imaging mode include: "auto" for automatically adjusting the imaging condition of the subject; "portrait" for adjusting the imaging condition to be suitable for image with a portrait as the main subject; "scenery" for adjusting the imaging condition to be suitable for image with a scenery as the main subject; "scenery and portrait" for adjusting the imaging condition to be suitable for image of a scenery and a portrait; "child" for adjusting the imaging condition to be suitable for image with a child as the main subject; "sport" for adjusting the imaging condition to be suitable for image of a sport scene; "candlelight" for adjusting the imaging condition to be suitable for image of a portrait under candlelight; "party" for adjusting the imaging condition to be suitable for image of a party scene where a plurality of portraits are present; and "pet" for adjusting the imaging condition to be suitable for image with a pet as the main subject.

The storage unit 6 constitutes a storage unit defined in the claims.

The display controller 7 performs a control to read image data for display temporarily stored in the memory 4 and display it on the display 8.

Specifically, the display controller 7 includes a VRAM, a VRAM controller, a digital video encoder and the like. The digital video encoder periodically reads, from the VRAM through the VRAM controller, the brightness signal Y and the color difference signals Cb and Cr read from the memory 4 and stored in the VRAM (not shown) under the control of the central control unit 12, generates a video signal based on these pieces of data, and outputs it to the display 8.

The display 8 is, for example, a liquid crystal display, and displays, on the display screen, an image imaged by the electronic imaging unit based on the video signal from the display controller 7. Specifically, the display 8 displays a live view image while successively updating, at a predetermined frame rate, a plurality of frame images imaged by the imaging unit 1 in a still imaging mode or in a moving imaging mode. The display 8 also displays an image (rec view image) recorded as a still image, and displays an image being recorded as a moving image.

The storage medium 9 is, for example, a nonvolatile memory (flash memory), and stores still image data for recording coded in a predetermined compression format by a coding unit (not shown) of the image processor 5 and moving image data consisting of a plurality of frame images.

The external connection unit 10 includes a terminal (for example, a USB terminal) for connection with the external device 200, and performs data transmission and reception through a predetermined communication table (for example, a USB table, not shown).

Specifically, the external connection unit 10 receives the weighting table T1 created by the weighting table creating processing (described later) by the external device 200 and transmitted from the external device 200.

The user interface 11 is for performing predetermined operations of the imaging apparatus 100. Specifically, the user interface 11 is provided with a shutter button associated with instructions as to subject imaging, a selection enter button associated with instructions as to selection of imaging modes, functions and the like, and a zoom button associated with instructions as to zoom amount adjustment (not shown), and outputs a predetermined operation signal to the central control unit 12 in response to an operation of these buttons.

Moreover, the selection enter button of the user interface 11 is for inputting an instruction to set one imaging from among a plurality imaging modes such as "auto", "portrait" "scenery", "scenery and portrait" "child", "sport" "candlelight", "party" and "pet" on a mode selection screen displayed on the display 8 based on a user operation of a menu button. According to the operation of the selection enter button, a predetermined setting signal is outputted to the central control unit 12.

The central control unit 12 sets the imaging mode desired by the user from among a plurality of imaging modes stored in the mode table T2 according to the input setting signal.

The user interface 11 and the central control unit 12 constitute a mode specifying unit for specifying one imaging mode from among a plurality of imaging modes.

The central control unit 12 controls units of the imaging apparatus 100. Specifically, the central control unit 12 is provided with a CPU (not shown), and performs various control operations according to various processing programs (not shown) for the imaging apparatus 100.

Next, the region of interest detecting processing will be described with reference to FIG. 3.

FIG. 3 is a flowchart showing an example of the operation associated with the region of interest detecting processing.

As shown in FIG. 3, the image obtaining unit 5a of the image processor 5 obtains the image data (YUV data) of the image generated by the image generator 3, for example, by imaging a live view image or a recording image by the imaging unit 1 (step S1).

It is assumed that when a live view image or a recording image is imaged by the imaging unit 1, one imaging mode is specified from among a plurality of imaging modes (for example, "portrait", "scenery", "scenery and portrait", "child", "sport", "candlelight", "party" and "pet").

Then, the feature map generator 5c of the image processor 5 generates a reduced-size image (for example, an image of VGA size) reduced at a predetermined ratio both horizontally (x axis) and vertically (y axis) based on the image data (YUV data) obtained by the image obtaining unit 5a (step S2), and then, generates the first to third feature maps F1 to F3 (see FIG. 4) using, for example, the contrast, the Bhattacharyya distance of the histogram and the degree of dispersion of each color (step S3).

Then, based on the imaging mode (for example, the imaging mode "pet") specified according to a user operation of the user interface 11 when a live view image or a recording image is imaged by the imaging unit 1, the imaging situation determining unit 5b of the image processor 5 determines the imaging condition of the subject corresponding to the imaging mode as the imaging situation (step S4).

Then, the weighting unit 5d of the image processor 5 determines, in the weighting table T1, the weighting factors w1 to w3 of the first to third feature maps F1 to F3 corresponding to the imaging situation (imaging mode) determined by the imaging situation determining unit 5b, and obtains them (step S5). Then, the feature distribution integrating unit 5e weights the first to third feature maps F1 to F3 according to the obtained weighting factors w1 to w3, and generates the integrated map T(x,y). Specifically, feature distribution integrating unit 5e generates the integrated map T(x,y) by multiplying the feature distributions of the first to third feature maps F1 to F3 and the corresponding weighting factors w1 to w3 together and integrating them according to the following expression (2) (step S6):

$$T(X, Y) = \sum_{i=0}^{I} wi \cdot Fi(x, y) \quad (2)$$

In the region of interest detecting processing, the order of the processing of generating the first to third feature maps F1 to F3 (step S3) and the processing of determining the imaging situation (step S4) may be opposite. That is, the processing of determining the imaging situation may be performed before the processing of generating the first to third feature maps F1 to F3.

Then, the region of interest detector 5f enlarges the integrated map T(x,y) both horizontally (x axis) and vertically (y axis) at a ratio corresponding to the reduction ratio so that it corresponds to the original size of the input image obtained by the image obtaining unit 5a. Then, the region of interest detector 5f applies the feature distribution of the enlarged integrated map T(x,y) to the input image, and detects a region having the predetermined threshold value or more as a region of interest (step S7). Then, the image processor 5 outputs the detected region of interest to the memory 4 (step S8), and the region of interest detecting processing is ended.

Next, the creation of the weighting table T1 will be now described.

Firstly, the structure of the external device 200 that executes the weighting table creating processing will be described with reference to FIG. 5.

Figure 5:
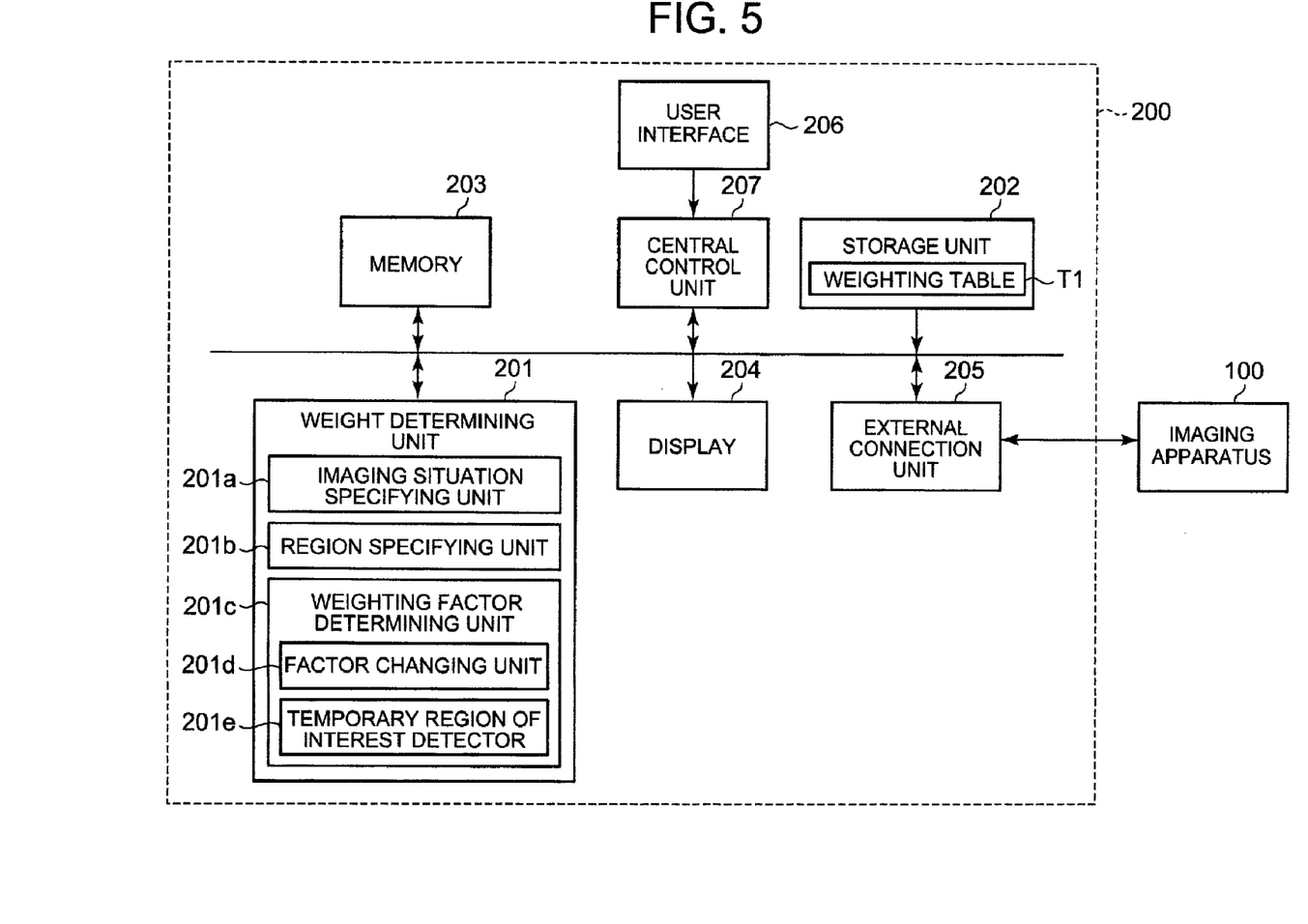
FIG. 5 is a block diagram showing an external device associated with the creation of the weighting table.

As shown in FIG. 5, the external device 200 includes a weight determining unit 201, a storage unit 202, a memory 203, a display 204, an external connection unit 205, a user interface 206 and a central control unit 207.

The weight determining unit 201 executes the weighting table creating processing. Specifically, the weight determining unit 201 includes an imaging situation specifying unit 201a, a region specifying unit 201b and a weighting factor determining unit 201c.

The imaging situation specifying unit 201a specifies the imaging situation of the image based on a user operation of the user interface 206.

Figure 7A:
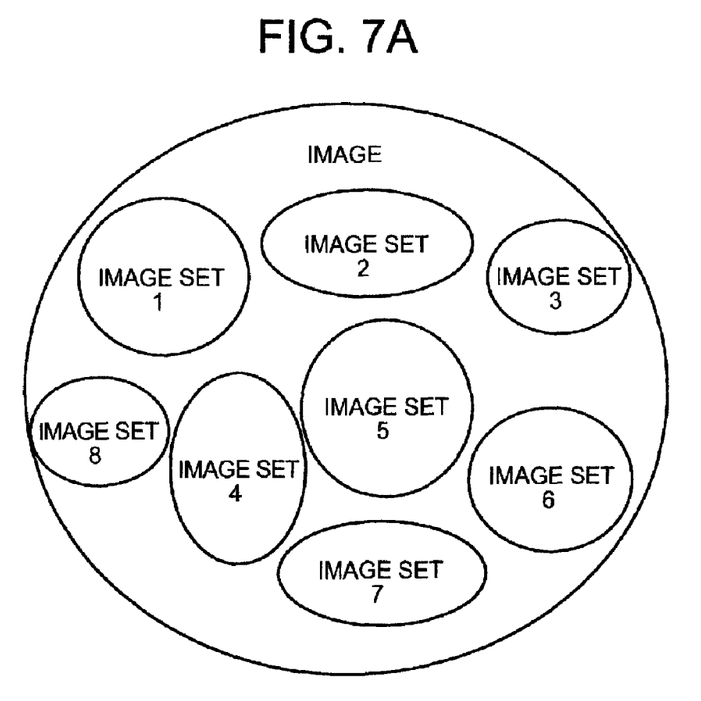
FIGS. 7A and 7B are views for explaining image sets associated with the weighting table creating processing.
Figure 7B:
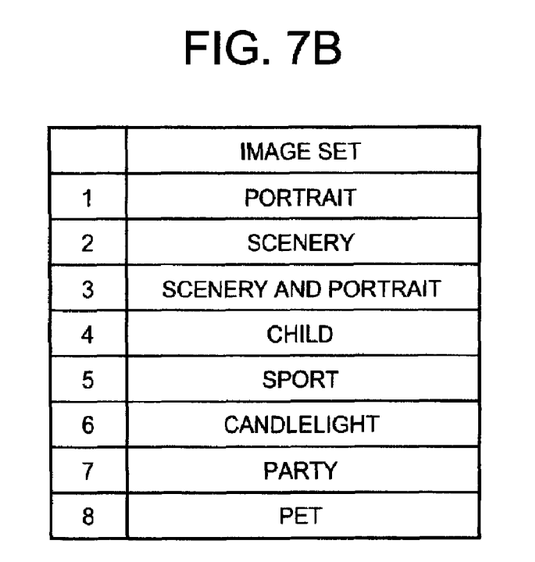

For a plurality of (for example, approximately 1000) images stored in the storage unit 202, the imaging situation specifying unit 201a selects and specifics an imaging scene corresponding to an imaging mode of the imaging apparatus 100 based on a predetermined operation of the user interface 206 by each of at least one user, and performs labeling according to the imaging condition of the subject corresponding to the specified imaging scene or the imaging mode. Specifically, the imaging situation specifying unit 201a sorts a plurality of images into image sets 1 to 8 (see FIGS. 7A and 7B) according to imaging scenes such as "portrait", "scenery", "scenery and portrait", "child", "sport", "candlelight", "party" and "pet" corresponding to the imaging modes of the imaging apparatus 100. By doing this, the imaging situation specifying unit 201a specifies the imaging situation of each of a plurality of image.

When a plurality of different imaging scenes are specified by a plurality of users for one image, labeling may be performed so that the image corresponds to one of the imaging scene by majority vote or by taking the average, or labeling may be performed so that the image corresponds to each of the specified plurality of imaging scenes.

The imaging situation specifying unit 201a and the user interface 206 constitute a region specifying unit for specifying the imaging situation of the image.

The region specifying unit 201b specifies a region of interest receiving attention from the user in each image based on a user operation of the user interface 206.

The region specifying unit 201b specifies a main subject region (region of interest) based on a predetermined operation of the user interface 206 by each of a plurality of users for all the images in each image set, and averages the specified plurality of region of interests, thereby generating a correct answer map Sj(x,y) as the region of interest. Specifically, for example, for one image j (for example, an image whose main subject is a deer) included in the image set 8, the region specifying unit 201b specifies a main subject region based on a predetermined operation of the user interface 206 by each of a plurality of users, generates a correct answer map Sj(x,y) by averaging the plurality of main subject areas, and then, stores the map Sj(x,y) into the image set in a state of being associated with the image j (original image) (see FIG. 8).

Figure 8:
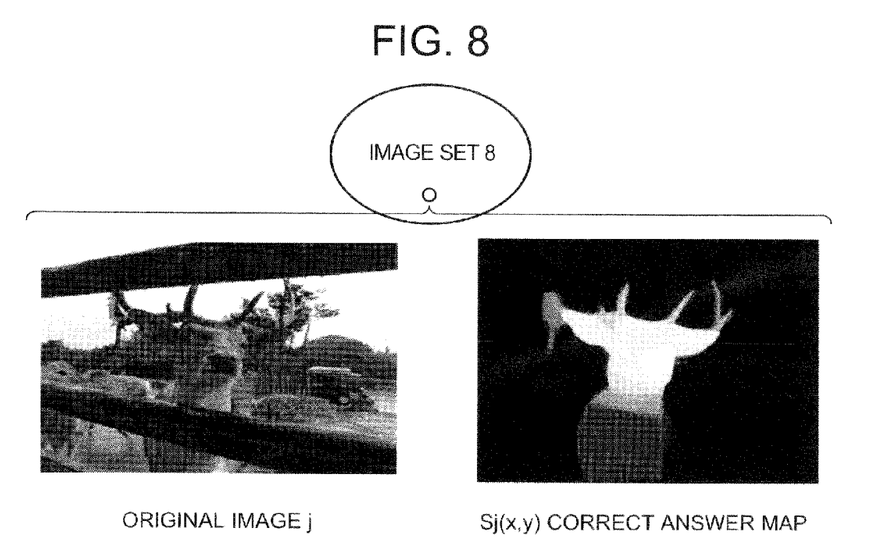
FIG. 8 is a schematic view showing an example of the image sets.

The correct answer map Sj(x,y) is expressed by values "0" to "1", and a region acknowledged as a main subject region by a larger number of portraits takes a value closer to "1". In FIG. 8, the closer to "1" the value of a region is, the whiter the region is. Moreover, the correct answer map Sj(x,y) has a size reduced from the original image at a predetermined ratio both horizontally (x axis) and vertically (y axis) (for example, VGA size [x×y: 640×480 pixels]). Here, "j" is the index of an image included in the image set (for example, the image set 8) specified by the user as the processing object.

The region specifying unit 201b and the user interface 206 constitute a region specifying unit for specifying a region of interest receiving attention from the user in the image.

The weighting factor determining unit 201c determines the weighting factors w1 to w3 of the first to third feature maps F1 to F3 for each image set, and specifically, includes a factor changing unit 201d and a temporary region of interest detector 201e.

Figure 9:
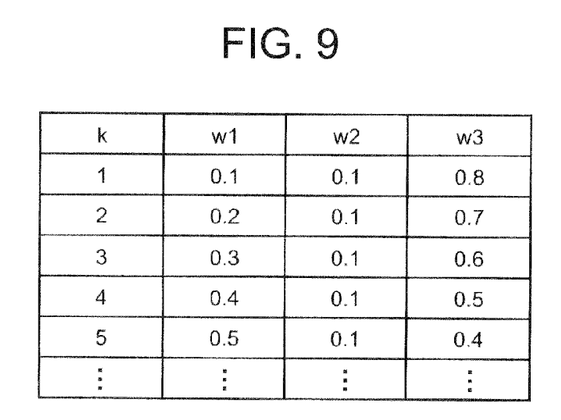
FIG. 9 is a view showing an example of weighting factors associated with the weighting table creating processing.

The factor changing unit 201d variously changes the weighting factors w1 to w3 of the first to third feature maps F1 to F3. Specifically, when a temporary integrated map Tjk(x,y) is generated by the temporary region of interest detector 201e, the factor changing unit 201d variously changes the value of "k" in a factor determination table (see FIG. 9) that defines the weighting factors w1 to w3 of the first to third feature maps F1 to F3.

Here, "k" is the index for specifying various combinations of w1 to w3.

The temporary region of interest detector 201e generates the temporary integrated map Tjk(x,y) from the image based on the feature distributions of the first to third feature maps F1 to F3 weighted according to the weighting factors w1 to w3 changed and specified by the factor changing unit 201d.

Specifically, the temporary region of interest detector 201e generates a reduced-size image reduced at a predetermined ratio both horizontally (x axis) and vertically (y axis) (for example, an image of VGA size [x×y: 640×480 pixels]) based on the image data of the image where the correct answer map Sj(x,y) has been generated, and then, generates the first to third feature maps F1 to F3 using, for example, the contrast, the Bhattacharyya distance of the histogram and the degree of dispersion (degree of gathering) of each color. Then, the temporary region of interest detector 201e generates the temporary integrated map Tjk(x,y) by performing a weighting computation on the feature distributions of the first to third feature maps F1 to F3 according to the weighting factors w1 to w3 specified by the factor changing unit 201d according to the following expression (3):

$$Tjk(X, Y) = \sum_{i=0}^{I} wi \cdot Fi(x, y) \quad (3)$$

Here, "i" is the index for specifying the first to third feature maps F1 to F3 and the weighting factors w1 to w3, "j" is the index of an image included in the image set (for example, the image set 8) specified by the user as the processing object, and "k" is the index for specifying various combinations of w1 to w3.

The temporary region of interest detector 201e constitutes a temporary detector for detecting a temporary region of interest (temporary integrated map Tjk(x,y)) from the image based on the feature distributions of a plurality of feature maps weighted according to the weighting factors w1 to w3.

Figure 10A:
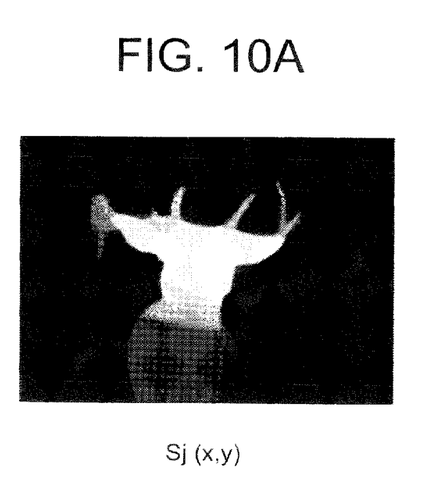
FIGS. 10A and 10B are views showing an example of a correct answer map and a temporary integrated map associated with the weighting table creating processing.
Figure 10B:
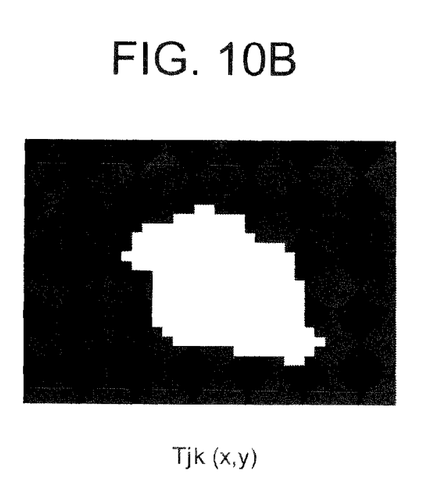

Then, according to the following expression (4), the weighting factor determining unit 201c calculates, as the degree of agreement Tk, the degree of region overlap between the temporary integrated map Tjk(x,y) calculated by the temporary region of interest detector 201e (see FIG. 10B) and the correct answer map Sj(x,y) specified by the region specifying unit 201b (see FIG. 10A) according to the weighting factors w1 to w3 changed by the factor changing unit 201d for each image set:

$$Tk = \frac{\sum_{x=0}^{640} \cdot \sum_{y=0}^{480} Sj(x, y) \cdot Tjk(x, y)}{\sum_{x=0}^{640} \cdot \sum_{y=0}^{480} Sj(x, y)} \times \frac{\sum_{x=0}^{640} \cdot \sum_{y=0}^{480} Sj(x, y) \cdot Tjk(x, y)}{\sum_{x=0}^{640} \cdot \sum_{y=0}^{480} Tjk(x, y)} \quad (4)$$

The degree of agreement Tk is expressed by a value between "0" and "1", and takes a value closer to "1" as the degree of region overlap between the temporary integrated map Tjk(x,y) and the correct answer map Sj(x,y) increases. The expression (4) associated with the calculation of the degree of agreement is merely an example and the present invention is not limited thereto. The expression may be arbitrarily changed as appropriate as long as it is an expression associated with the calculation of the degree of agreement between the temporary integrated map Tjk(x,y) and the correct answer map Sj(x,y).

Then, the weighting factor determining unit 201c determines the highest one of a plurality of degrees of agreement Tk calculated according to a plurality of weighting factors w1 to w3 changed and specified by the factor changing unit 201d. The weighting factor determining unit 201c determines the weighting factors w1 to w3 associated with the calculation of the highest degree of agreement Tk as a combination of the weighting factors w1 to w3 of each of the first to third feature maps F1 to F3 in the imaging situation (for example, the imaging scene "pet" corresponding to the image set 8) specified by the imaging situation specifying unit 201a.

The weighting factor determining unit 201c performs the above-described processing on the weighting factors w1 to w3 of all the image sets to thereby generate the weighting table T1 in which the weighting factors w1 to w3 of the first to third feature maps F1 to F3 are associated with each other for each of a plurality of image sets.

Thus, the weighting factor determining unit 201c constitutes a determining unit for determining the weighting factors w1 to w3 of each of a plurality of feature maps based on the imaging situation specified by the imaging situation specifying unit 201a and the correct answer map Sj(x,y) as the region of interest specified by the region specifying unit 201b.

The storage unit 202 is, for example, a nonvolatile memory (flash memory), and stores various programs and data (not shown) necessary for the operation of the central control unit 207.

The storage unit 202 also stores the weighting table T1 (see FIG. 2) created by the weighting table creating processing.

The memory 203 is, for example, a DRAM, and temporarily stores data processed by the weight determining unit 201, the central control unit 207 and the like.

The display 204 is a display such as an LCD (liquid crystal display) or a CRT (cathode ray tube), and displays various pieces of information under the control of the central control unit 207.

The external connection unit 205 is provided with a terminal (for example, a USB terminal) for connection with the imaging apparatus 100, and performs data exchange through a predetermined communication cable (for example, a USB table, not shown).

Specifically, the external connection unit 205 transmits the weighting table T1 created by the weighting table creating processing and stored in the storage unit 202 to the imaging apparatus 100.

The user interface 206 is provided with an operation unit such as a mouse and a keyboard constituted by a data input key for inputting numerical values, letters and the like, upper, lower, right and left movement keys for performing data selection, scrolling and the like and various function keys, and outputs a predetermined operation signal to the central control unit 207 according to the operation of the operation unit.

The central control unit 207 controls the respective units of the external device 200. Specifically, the central control unit 207 includes a CPU (not shown), and performs various control operations according to various processing programs (not shown) for the external device 200.

Next, the weighting table creating processing executed by the weight determining unit 201 will be described with reference to FIGS. 6 to 10.

Figure 6:
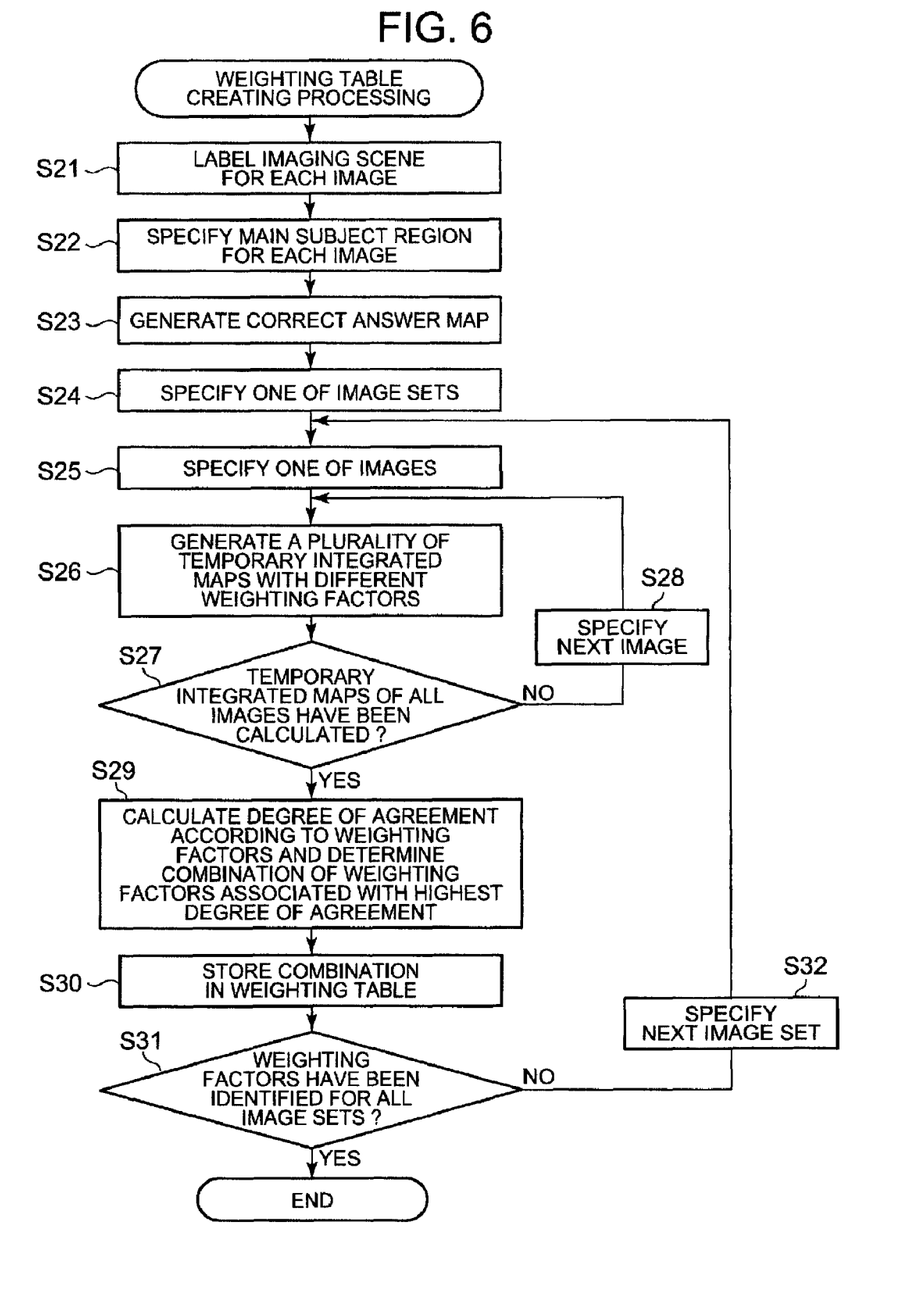
FIG. 6 is a flowchart showing an example of an operation associated with the weighting table creating processing by the external device of FIG. 5.

FIG. 6 is a flowchart showing an example of the operation associated with the weighting table creating processing.

As shown in FIG. 6, first, the imaging situation specifying unit 201a sorts a plurality of (for example, approximately 1000) images stored in the storage unit 202, into image sets 1 to 8 (see FIGS. 7A and 7B) by selecting and specifying an imaging scene based on a predetermined operation of the user interface 206 by each of a plurality of users and performing labeling according to the specified imaging scene (step S21).

Then, for all the images in each image set (for example, the image set 8), the region specifying unit 201b specifies a main subject region (for example, the image region of a deer as the main subject) based on a predetermined operation of the user interface 206 by each of a plurality of users (step S22), and averages the specified plurality of region of interests to thereby generate the correct answer map Sj(x,y) as the region of interest (step S23, see FIG. 8).

Then, the weighting factor determining unit 201c specifies, as the processing object, one image set (for example, the image set 8) from among a plurality of image sets (step S24).

Then, the weighting factor determining unit 201c specifies one image from among a plurality of images in the image set specified as the processing object (step S25), and then, the temporary region of interest detector 201e generates each temporary integrated map Tjk(x,y) from the image according to the following expression (5) based on the feature distributions of the first to third feature maps F1 to F3 weighted according to each of a plurality of weighting factors w1 to w3 (see FIG. 9) changed and specified by the factor changing unit 201d (step S26):

$$Tjk(X, Y) = \sum_{i=0}^{I} wi \cdot Fi(x, y) \quad (5)$$

Then, the weighting factor determining unit 201c determines whether or not the temporary integrated map Tjk(x,y) has been generated for all the images in the image set specified as the processing object (step S27). When it is determined that the temporary integrated map Tjk(x,y) has not been generated for all the images (step S27; NO), the next image is specified in the image set specified as the processing object (step S28), and then, the process goes to step S26.

The step S26 is repeatedly performed until it is determined at step S27 that the temporary integrated map Tjk(x,y) has been generated for all the images (step S27; YES).

When it is determined at step S27 that the temporary integrated map Tjk(x,y) has been generated for all the images (step S27; YES), for the image set specified as the processing object, the weighting factor determining unit 201c calculates the degree of agreement Tk between the temporary integrated map Tjk(x,y) and the correct answer map Sj(x,y) according to the weighting factors w1 to w3 changed by the factor changing unit 201d according to the following expression (6) (see FIGS. 10A and 10B):

$$Tk = \frac{\sum_{x=0}^{640} \cdot \sum_{y=0}^{480} Sj(x, y) \cdot Tjk(x, y)}{\sum_{x=0}^{640} \cdot \sum_{y=0}^{480} Sj(x, y)} \times \frac{\sum_{x=0}^{640} \cdot \sum_{y=0}^{480} Sj(x, y) \cdot Tjk(x, y)}{\sum_{x=0}^{640} \cdot \sum_{y=0}^{480} Tjk(x, y)} \quad (6)$$

Then, the weighting factor determining unit 201c determines the highest one of a plurality of degrees of agreement Tk calculated according to a plurality of weighting factors w1 to w3 changed and specified by the factor changing unit 201d, and then, determines the weighting factors w1 to w3 associated with the calculation of the highest degree of agreement Tk, as a combination of the weighting factors w1 to w3 of each of the first to third feature maps F1 to F3 in the imaging situation (for example, the imaging scene "pet" corresponding to the image set 8) (step S29).

Then, the weight determining unit 201 stores, in the weighting table T1, the identified combination of the weighting factors w1 to w3 of the first to third feature maps F1 to F3 in a state of being associated with the image set specified as the processing object (step S30).

Then, the weight determining unit 201 determines whether or not a combination of the weighting factors w1 to w3 has been determined for all the plurality of imaging sets (step S31). When it is determined that a combination of the weighting factors w1 to w3 has not been generated for all the image sets (step S31; NO), the weighting factor determining unit 201c specifies the next image set from among a plurality of image sets (step S32), and then, the weight determining unit 201 moves the process to step S25, and executes the step S25 and succeeding steps.

The step S25 and succeeding steps are repeatedly performed until it is determined at step S31 that a combination of the weighting factors w1 to w3 has been generated for all the image sets (step S31; YES).

By doing this, the weighting factor determining unit 201c generates the weighting table T1 in which the weighting factors w1 to w3 of the first to third feature maps F1 to F3 are associated with each of a plurality of image sets.

When it is determined at step S31 that a combination of the weighting factors w1 to w3 has been generated for all the image sets (step S31; YES), the weighting table creating processing is ended.

As described above, in the imaging apparatus 100 of the present embodiment, the weight on the kind of the feature of the region to be extracted from the image is not fixed contrary to the related art, but the weights on a plurality of feature maps can be flexibly changed in consideration of the imaging situation by determining the imaging situation of the image aid weighting a plurality of feature maps according to the imaging situation. The feature distributions of a plurality of weighted feature maps are integrated to generate an integrated map and a region interest is detected from the image based on the integrated map, whereby a region of interest receiving a high degree of attention from the user can be appropriately detected in consideration of the imaging situation.

Moreover, since a plurality of imaging modes and imaging conditions are stored in a state of being associated with each other, a plurality of feature maps can be weighted according to the imaging condition associated with one imaging mode specified from among a plurality of imaging mode. That is, since only by determining an imaging mode (for example, the imaging mode "pet") according to a user operation of the user interface 11 when a live view image or a recording image is imaged by the imaging unit 1, the imaging condition corresponding to the imaging mode is determined by the imaging situation, the imaging situation associated with the weighting of a plurality of feature maps can be appropriately determined. By doing this, the weights on a plurality of feature maps can be appropriately changed in consideration of the imaging situation.

Moreover, since the weighting factors w1 to w3 of each of a plurality of feature maps and an imaging condition stored in the weighting table T1 in a state of being associated with each other, only by determining an imaging condition as the imaging situation of the image by the imaging, situation determining unit 5b, the weighting factors w1 to w3 associated with the imaging condition can be obtained, and a plurality of feature maps can be easily and quickly weighted.

In creating the weighting table T1, only by determining the imaging situation and the main subject region (region of interest) of the image based on a user operation of the user interface 206 in the external device 200, the weighting factors w1 to w3 of each of a plurality of feature maps can be appropriately determined based on the imaging situation and the main subject region. Specifically, the temporary integrated map Tjk(x,y) is generated from the image based on the feature distributions of a plurality of feature maps weighted according to the weighting factors w1 to w3, and a combination of the weighting factors w1 to w3 where the degree of agreement Tk between the correct answer map Sj(x,y) generated based on the main subject region and the temporary integrated map Tjk(x,y) is highest is determined, whereby a combination of the weighting factors w1 to w3 of each of a plurality of feature maps can be determined.

The present invention is not limited to the above-described embodiment, but various improvements and design changes may be made without departing from the purport of the present invention.

For example, while the weighting table T1 is created by the external device 200 different from the imaging apparatus 100, the present invention is not limited thereto. That is, while an image processing system in which the weighting table T1 is created by the external device 200 and is used in the imaging apparatus 100 is shown as an example, the structure of the imaging apparatus 100 and the external device 200 shown in the above-described embodiment is merely an example, and the image processing apparatus may be one provided with all the functions of the imaging apparatus 100 and the external device 200.

Moreover, the image processing apparatus may be one in which the image to be processed is imaged by an imaging apparatus different from the imaging apparatus 100, the image data of the image transferred from this imaging apparatus is obtained and a region of interest is detected.

In addition, while the functions as the obtaining unit, the generator, the weighting, unit and the detector are implemented by driving the image obtaining unit 5a, the feature map generator 5c, the weighting unit 5d and the region of interest detector 5f of the image, processor 5 under the control of the central control unit 12 in the above-described embodiment, the present invention is not limited thereto. They may be implemented by executing a predetermined program by the CPU of the central control unit 12.

That is, a program including an obtaining processing routine, a generating processing routine, an imaging situation determining processing routine, a weighting processing routine and a detecting processing routine is stored in a program memory (not shown) storing programs. The CPU of the central control unit 12 may be caused to function as the obtaining unit for obtaining an image by the obtaining processing routine. Moreover, the CPU of the central control unit 12 may be caused to function as the generator for generating a feature map for each of a plurality of features of the image by the generating processing routine. Moreover, the CPU of the central control unit 12 may be caused to function as the imaging situation determining unit for determining an imaging situation of the image by the imaging situation determining processing routine. Moreover, the CPU of the central control unit 12 may be cause to function as the weighting unit for weighting a plurality of feature maps according to the imaging situation of the image by the weighting processing, routine. Moreover, the CPU of the central control unit 12 may be caused to function as the detector for detecting a region of interest from the image based on the feature distributions of the plurality of feature maps by the detecting processing routine.

While the present invention has been shown and described with reference to certain exemplary embodiments thereof, it will be understood by those skilled in the art that various changes in form and details may be made therein without departing from the spirit and scope of the invention as defined by the appended claims. It is aimed, therefore, to cover in the appended claim all such changes and modifications as fall within the true spirit and scope of the present invention.

What is claimed is:

1. An image processing apparatus comprising:
   an obtaining unit configured to obtain an image, the obtaining unit comprising an imaging unit configured to set an imaging condition of the image;
   a generating unit configured to generate a plurality of feature maps for a plurality of features of the image, wherein each of the feature maps corresponds to one of the features of the image;
   an imaging situation determining unit configured to determine the imaging condition set by the imaging unit;
   a weighting factor storage unit configured to store weighting factors for the feature maps and imaging conditions therein such that the weighting factors and the imaging conditions are associated with each other;
   a weighting unit configured to read weighting factors that are associated with the imaging condition determined by the imaging situation determining unit, and to weight the feature maps using the read weighting factors; and
   a detector configured to detect a region of interest from the image based on feature distributions of the weighted feature maps.

2. The apparatus according to claim 1, further comprising:
   a storage unit configured to store a plurality of imaging modes and imaging conditions therein, such that the imaging modes and the imaging conditions are associated with each other; and
   a mode specifying unit configured to specify one of the imaging modes;
   wherein the imaging unit is configured to set the imaging condition that is associated with the specified imaging mode.

3. The apparatus according to claim 1, further comprising:
   an integrating unit configured to integrate the feature distributions of the weighted feature maps;
   wherein the detector is configured to detect the region of interest from the image based on the feature distributions integrated by the integrating unit.

4. An image processing method comprising:
   setting an imaging condition;
   obtaining an image under the set imaging condition;
   generating a plurality of feature maps for a plurality of features of the image, wherein each of the feature maps corresponds to one of the features of the image;
   determining the set imaging condition;
   reading weighting factors that are associated with the determined imaging condition from among stored weighting factors for the feature maps and imaging conditions, the weighting factors being stored such that the weighting factors and the imaging conditions are associated with each other;
   weighting the feature maps using the read weighting factors; and
   detecting a region of interest from the image based on feature distributions of the weighted feature maps.

5. A non-transitory computer-readable storage medium having a program stored thereon, the program being executable to control a computer to perform operations comprising:
   setting an imaging condition;
   obtaining an image under the set imaging condition;
   generating a plurality of feature maps for a plurality of features of the image, wherein each of the feature maps corresponds to one of the features of the image;
   determining the set imaging condition;
   reading weighting factors that are associated with the determined imaging condition from among stored weighting factors for the feature maps and imaging conditions, the weighting factors being stored such that the weighting factors and the imaging conditions are associated with each other;
   weighting the feature maps using the read weighting factors; and
   detecting a region of interest from the image based on feature distributions of the weighted feature maps.

* * * * *